Figure 1:
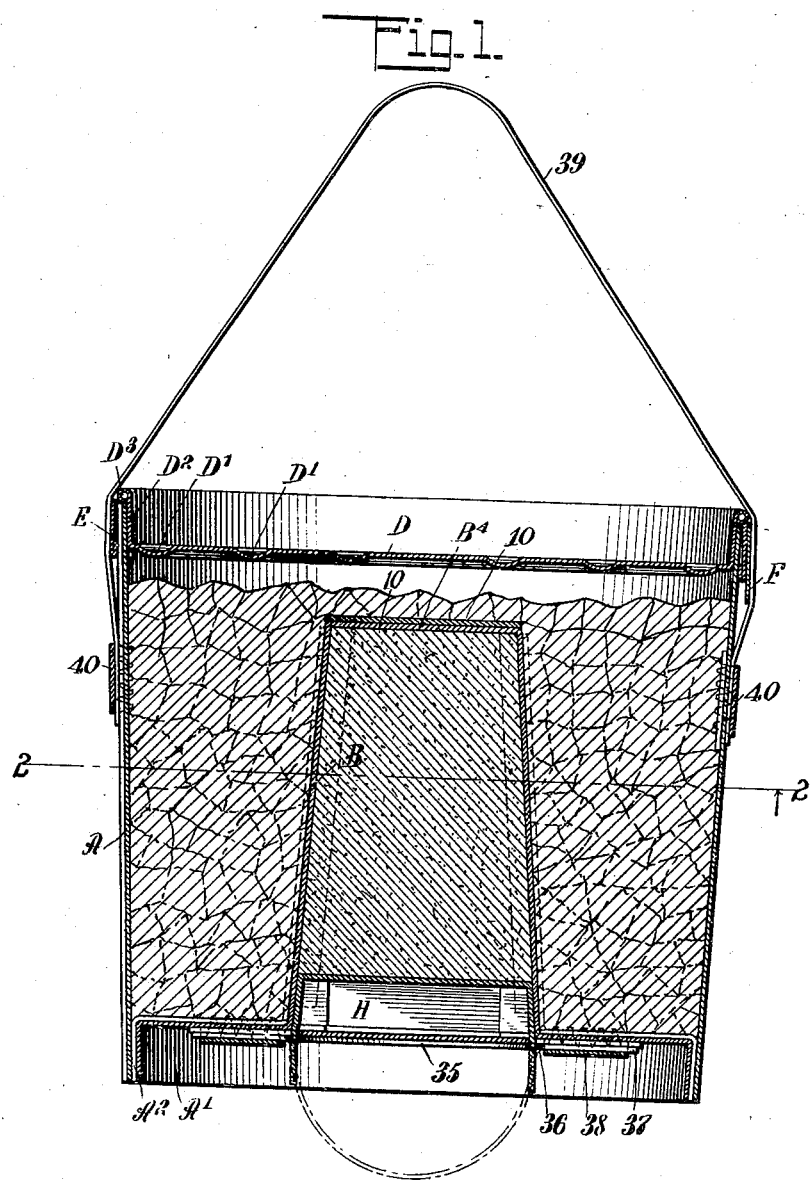

O. J. WEEKS.
RECEPTACLE.
APPLICATION FILED AUG. 23, 1909.

966,278.

Patented Aug. 2, 1910.
3 SHEETS—SHEET 1.

WITNESSES

INVENTOR
Oscar J. Weeks
BY
ATTORNEYS

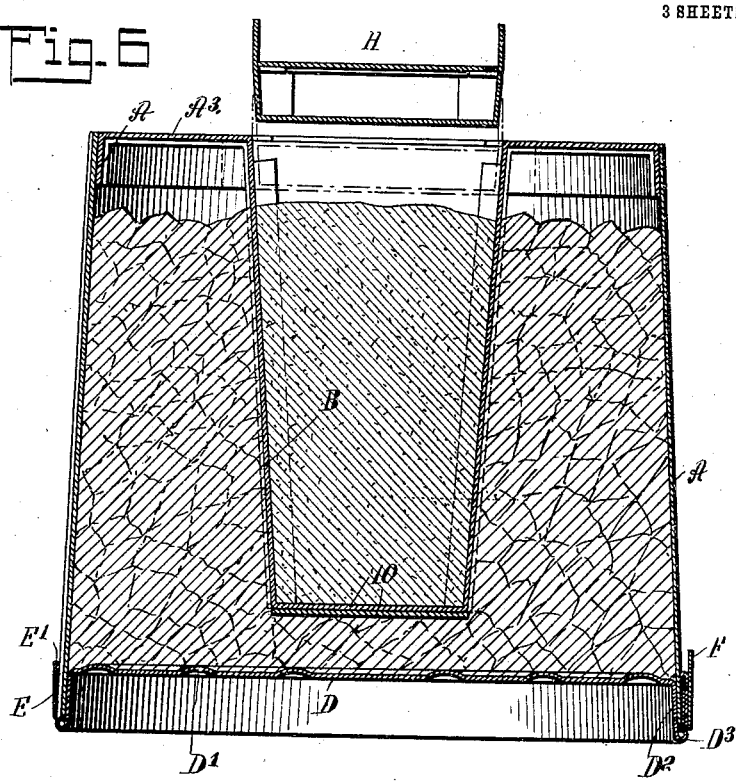
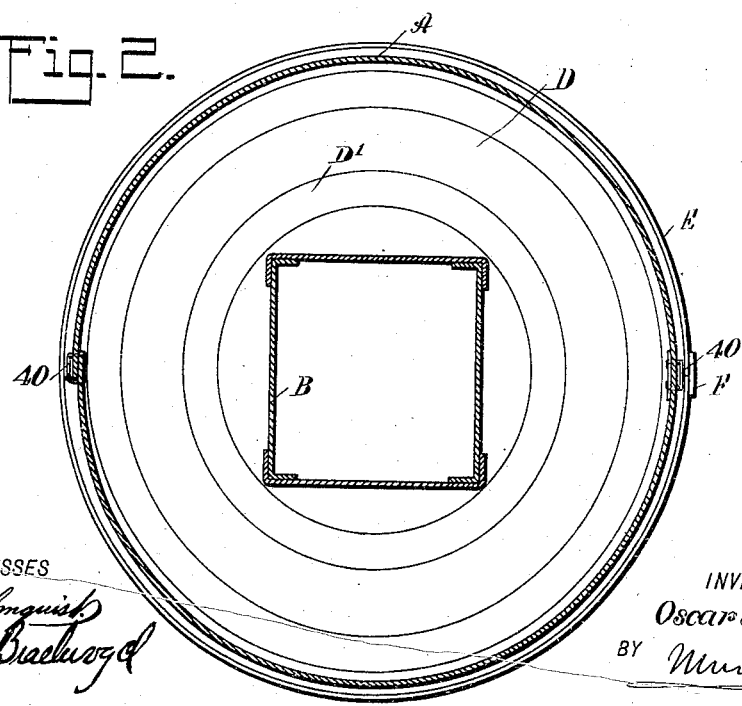

O. J. WEEKS.
RECEPTACLE.
APPLICATION FILED AUG. 23, 1909.
966,278.
Patented Aug. 2, 1910.
3 SHEETS—SHEET 3.
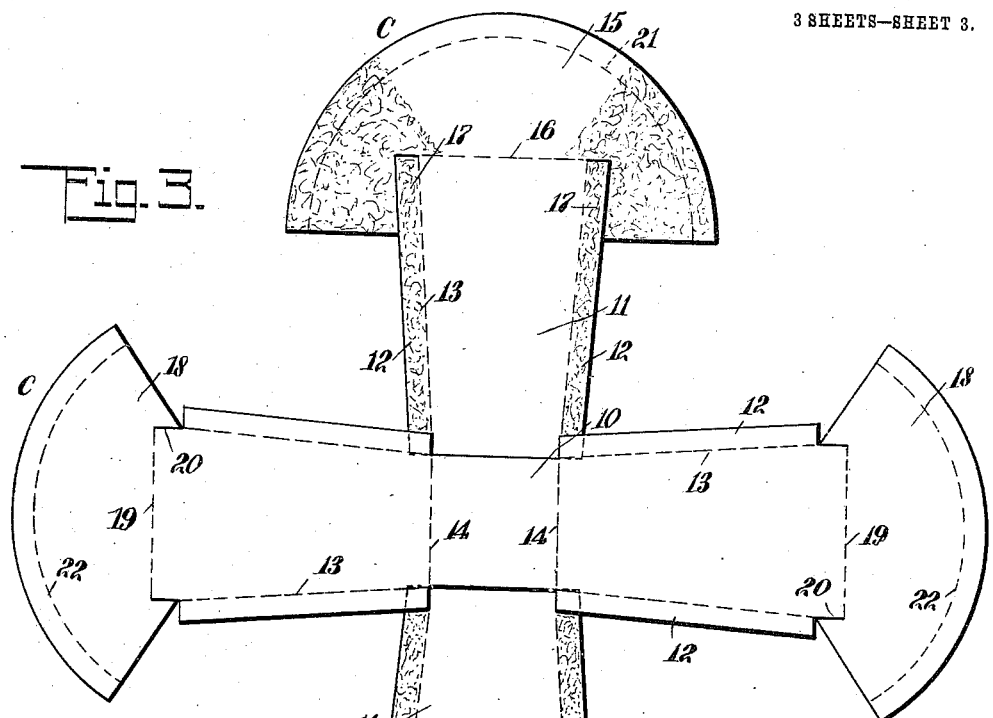
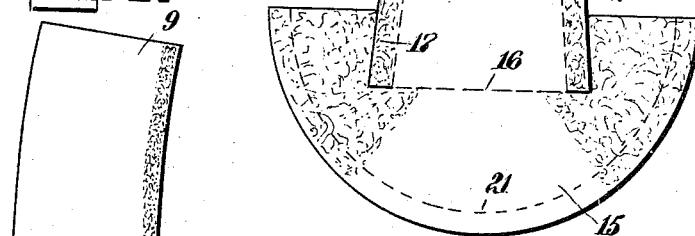
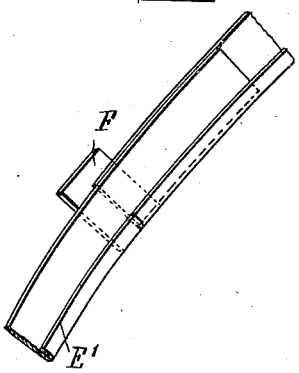
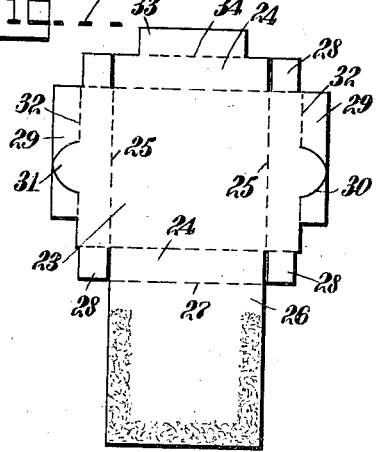
WITNESSES
INVENTOR
Oscar J. Weeks
BY
ATTORNEYS

UNITED STATES PATENT OFFICE.

OSCAR JOHN WEEKS, OF NEW YORK, N. Y.

RECEPTACLE.

966,278.  Specification of Letters Patent.  Patented Aug. 2, 1910.

Application filed August 23, 1909. Serial No. 514,112.

*To all whom it may concern:*

Be it known that I, OSCAR J. WEEKS, a citizen of the United States, and a resident of the city of New York, borough of Manhattan, in the county and State of New York, have invented a new and Improved Receptacle, of which the following is a full, clear, and exact description.

This invention relates to receptacles or carriers for ice cream, oysters, liquids or the like, and more particularly to a receptacle comprising an inner and an outer vessel, the inner one of which receives the ice cream or other substance to be preserved therein, and the outer one which receives the ice or other preserving substance, the vessels being preferably tapered or otherwise so formed that the contents thereof can be easily introduced and removed.

More particularly, the invention relates to a receptacle for ice cream and the like, fashioned from heavy paper, cardboard and other suitable material, and formed of blanks folded and glued, cemented or otherwise secured together, and having vessels connected at one extremity, the outer vessel being provided with a removable end wall at the other extremity.

An object of the invention is to provide a simple, strong and durable receptacle or carrier for ice cream and the like, which can be constructed so cheaply that the retailer can, if he so desire, give it away with his wares, by means of which the ice cream or other contents of the receptacle can be transported for long distances or can be kept for comparatively long periods without injury, and which is so designed that a number of the receptacles can be piled together or nested in a small space when the end walls of the outer receptacles have been removed.

A further object of the invention is to provide a receptacle of the class described, in which the inner vessel receives the substance to be preserved and is entirely surrounded by the outer vessel which receives the refrigerant or the like, in which the closures of the vessels fit so closely and are of such form that leakage from the vessels is practically obviated, and in which the vessels are preferably oppositely tapered so that the contents thereof can be introduced and removed without difficulty.

The invention consists in the construction and combination of parts, to be more fully described hereinafter and directly set forth in the claims.

Reference is to be had to the accompanying drawings forming a part of this specification in which similar characters of reference indicate corresponding parts in all the views, and in which—

Figure 1 is a longitudinal section of an embodiment of my invention; Fig. 2 is a horizontal section on the line 2—2 of Fig. 1; Fig. 3 is a plan view showing certain of the blanks from which the receptacle is formed; Fig. 4 is a similar view showing another of the blanks; Fig. 5 is a perspective view showing part of a hook used in assembling the parts of the receptacle; Fig. 6 is a view similar to Fig. 1, showing a modified form of the device; and Fig. 7 is a plan view of a blank used to form the closure for the inner vessel.

Before proceeding with a more detailed explanation of my invention, it should be understood that the forms of the receptacle shown in the present application constitute improvements upon the receptacle shown in my United States Patent No. 924,205, dated June 8, 1909. Like the device there disclosed, the herein described receptacle is particularly useful for carrying and preserving ice cream and the like but it can also be advantageously employed for transporting and storing other substances, preferably food stuffs or the like, which are of a perishable nature, and which are customarily preserved by means of a refrigerant such as a mixture of ice and salt. The manufacturers of ice cream and similar food stuffs usually retail their wares and deliver them to their customers in cans or other vessels arranged in wooden buckets, partly filled with ice and salt. These buckets are heavy and difficult to transport; furthermore, they are expensive and are frequently lost, and it is necessary for the dealer to have them called for after delivery. This all entails considerable expense and trouble. By means of my invention it is possible to provide a suitable receptacle for carrying and delivering ice cream, which can be manufactured so inexpensively that the dealer, who so desires, need not call for the receptacle, but can give it away with the wares which he purveys. I prefer to fashion the receptacle from heavy paper, cardboard or the like, paraffined or otherwise rendered substantially impervious to moisture. I find it essential for the successful practical utilization of a receptacle of this type to have it so formed that a number of receptacles can be nested or otherwise assembled in a comparatively small space for shipping and storing the receptacles. To accomplish this purpose the present type of my invention has a removable end wall or bottom, which can be removed with little difficulty, so that a large number of the receptacles can be nested, that is, telescoped one with the other in a comparatively small space, the tapered form of the receptacle of course facilitating this procedure. The removable bottom or end is preferably fashioned from sheet metal, and a metal hoop, as will appear more clearly hereinafter, is used for retaining it in position.

I have found it preferable to fashion the inner vessel of the receptacle of substantially rectangular cross section, that is, similar to the inner vessel of the receptacle shown in my Patent No. 924,205, and to have the outer vessel of circular cross section to permit the removable end to be of circular form and at the same time to permit the employment of a circular, that is, of an annular hoop. The inner vessel is fashioned by suitably bending, folding and securing two blanks of similar and symmetrical form which are arranged transversely with one another and at substantially right angles as is the case with the other type of receptacle. The outer vessel in the present form, however, is fashioned from a separate blank, to which are secured portions of the first mentioned blanks, these portions constituting a connecting end between the inner and outer vessels. The inner vessel has one end open and provided with a suitable cover or lid fashioned from a separate blank. The removable end constitutes a closure for the outer vessel.

Referring more particularly to the drawings, A represents the outer vessel of the receptacle, which is tapered and of substantially circular cross section. It is fashioned from a suitably formed blank 9, shown in Fig. 4, which is rolled into the form of a truncated cone and glued along the elemental edge 8 in the customary manner. The inner vessel B is connected with the outer vessel A by the integral end wall or bottom A' and is tapered oppositely to the outer vessel. The inner vessel B is formed from two elongated blanks C of similar and symmetrical form. Each of the blanks C has a central portion 10, the opposite sides of which are parallel and which are in contact when the blanks are placed in position to be folded to form the receptacle, as is shown most clearly in Fig. 3. The superposition of one blank upon the other, with one portion 10 upon the corresponding portion 10, provides a double end or bottom $B^4$ for the inner vessel B. Each of the blanks has the portion 10 extended at opposite ends to form outwardly tapered sections 11, which form the opposite side walls of the inner vessel B. The sections 11 at the side edges have elongated flaps 12 formed by crease lines 13, to permit the flaps to be easily folded in forming the receptacle. The portion 10 of the blank is demarked from the section 11 by suitable crease lines 14. At the outer ends of the sections 11 of one of the blanks C are laterally extended sections 15 demarked by crease lines 16 and lines of severance 17, the latter forming parts of the edges of the flaps 12. The sections 15 have the outer edges curved so that they are substantially semi-circular in form. The other of the blanks C at the outer ends of the sections 11 has extended sections 18, the outer edges of which are curved and which are demarked by crease lines 19 and lines of severance 20. The latter are continuations of the crease lines 13, the flaps 12 of this blank C being shorter than the corresponding flaps of the other blank C. The sections 15 and 18 have respectively crease lines 21 and 22 concentric with the curved edges and spaced inwardly therefrom a substantial distance for a purpose which will appear more clearly hereinafter.

The inner vessel B is formed by folding the sections 11 of the blanks C and gluing the flaps 12 to the adjacent sections 11 in the usual manner. The sections 15 and 18 form the circular end wall or bottom which connects the inner and the outer vessel. The crease lines 21 and 22 assist in providing the circular end A' with a crimped flange $A^2$ which permits the end to be inwardly spaced from the rim of the outer vessel, as is shown most clearly in Fig. 1. In this form of the device, the end A' constitutes the bottom of the receptacle, for it has been found of advantage to provide receptacles of this kind with means for maintaining the bottom of the receptacle out of contact with a table or other support upon which the receptacle may be placed, and thus to hold the contents a suitable distance above the support. It will be understood that the sections 15 have the ends provided with glue and have the sections 18 partly overlapping to form a moisture-proof end. The outer vessel has the lower edge provided at the inside with glue, so that the crimped edge or flange $A^2$ can adhere thereto, as is clearly shown in Fig. 1.

I preferably employ a removable end or cover D, fashioned from sheet metal, stamped or otherwise suitably formed for the purpose, and provided with concentric annular strengthening ribs D'. The end D has a laterally disposed rib or peripheral flange $D^2$, provided at the edge with a bead D³, which when the end is in position in the open extremity of the outer vessel seats against the edge of this outer vessel. To hold the end D in position, I employ a hoop E, preferably formed from a strip of metal, and having one edge turned back upon itself to form a peripheral flange or rib E'. The purpose of the latter will appear more clearly hereinafter. It is cut away at one end of the strip from which the hoop is formed so that the corresponding end of the strip can be received within the flange at the other end, as is shown most clearly in Fig. 5. I employ a securing member F, consisting of a substantially rectangular piece of sheet metal, soldered to the hoop at the overlapping ends to secure these ends together. I have found in practice that after the hoop is jammed in place upon the tapered receptacle the outer wall tends to swell from moisture or other causes so that the hoop is tightly secured in place and it is extremely difficult to slide it toward the extremity of the receptacle to release the end or cover D. It is an easy matter, however, to pull off the member F to release the extremities of the hoop and to permit the expeditious removal thereof. The hoop is thus, in effect, frangible. The flange or rib E' when the hoop is in position coincides in position, substantially, to the junction of the end or cover D with its flange D², and thus serves to force the outer vessel firmly against the edge of the cover D, to form a tight joint and serves to prevent leakage. The hoop acts like a barrel hoop owing to the tapered form of the vessel.

I provide the open end of the inner vessel B with a closure or cover formed from a blank G, consisting of a bottom 23, having at the edges side sections 24 demarked by crease lines 25. One of the sides 24 is integral with the top 26 demarked by a crease line 27. Two of the sides 24 have the ends extended to form tabs 28 and have longitudinal flaps 29 demarked by crease lines 32 and from which are formed by lines of severance 30, ears 31. The remaining side 24 has at the edge opposite its crease line 25 a flap 33 demarked by a crease line 34. The blank is folded so that a hollow cover H is formed, the tabs 28 being glued or cemented to the adjacent sides, while the flaps 29 and 33 are glued to the top 26. The ears 31 extend above the cover to permit the easy manipulation thereof, as is shown most clearly in Fig. 6.

In the form of receptacle shown in Fig. 1, I provide a cover retainer 35, consisting of a substantially curved wire or the like, having offset ends 36 adapted to be passed through openings in the ears 31, and removably received by sleeves 37 fastened upon the end or bottom A, by means of clips 38. In this form of the receptacle I employ a carrier or bail 39, consisting, for example, of a flexible strip of fabric or the like, having the ends fastened at opposite sides of the outer vessel by means of suitable clips 40. It will be understood that a carrier of this type does not interfere with the stacking or nesting of empty receptacles.

In the form of the device shown in Fig. 6, the end or the cover D constitutes the bottom of the receptacle while the end wall A³ constitutes the top. The device is otherwise formed in a manner similar to that in which the preferred type of the receptacle is fashioned, the only difference being that the flange A⁴ of the end wall A³ is oppositely disposed so that the end A³ is not inwardly spaced from the rim of the outer vessel but is flush therewith. In this form of the receptacle the top retaining member 35 can be dispensed with, as the inner vessel is not inverted and there is therefore no necessity for firmly securing the cover H in place, it being sufficient if it is merely forced into the tapered inner vessel.

Having thus described my invention, I claim as new and desire to secure by Letters Patent:

1. A receptacle, comprising an inner and an outer vessel, said outer vessel being of circular cross section and having a removable end, and a hoop encompassing said outer vessel and serving to hold said removable end in position, said hoop having an inwardly disposed rib engaging said outer vessel around an edge of said end, and compressing said outer vessel against the edge, to cause an air-tight joint to be formed between said outer vessel and said end.

2. A receptacle, comprising an inner and an outer vessel, said outer vessel being of circular cross section and having a removable end, a metallic hoop encompassing said outer vessel and serving to hold said removable end in position, said hoop being frangible.

3. A receptacle, comprising an inner and an outer vessel having a connecting wall, said inner vessel and said wall being formed from blanks arranged transversely of one another, and folded to form said inner vessel and said wall, said outer vessel having a removable end, and a metallic hoop for holding said removable end in position, said hoop encompassing said outer vessel and having a frangible part.

4. A receptacle, comprising an inner and an outer vessel, one of said vessels being circular in cross section, the other of said vessels being angular in cross section, one of said vessels being formed from blanks arranged transversely of one another, the other of said vessels being formed from a separate blank, said first-mentioned blanks having sections adapted to be secured to said last-mentioned blank, and constituting a common wall of a circular outline for said vessels, the outer of said vessels having a removable closure at the end opposite said common wall.

5. A receptacle, comprising an inner and an outer vessel, one of said vessels being circular in cross section, the other of said vessels being angular in cross section, one of said vessels being formed from blanks arranged transversely of one another, the other of said vessels being formed from a separate blank, said first-mentioned blanks having sections adapted to be secured to said last-mentioned blank, and constituting a common wall of a circular outline for said vessels, the outer of said vessels having a removable closure at one end, said sections being partly sectoral in form and overlapping, and a hoop encompassing said vessel having said removable end, to hold the latter in place.

6. A receptacle, comprising a vessel open at one extremity, an end mounted in said open extremity, and a frangible metallic hoop encompassing said vessel, to secure said end in place.

7. A receptacle, comprising a vessel, a removable end for said vessel, said removable end having a laterally disposed rim, and a hoop carried by said vessel and having a flange part adapted to engage said vessel on a line corresponding to an edge of said removable end, whereby a tight joint is formed, said hoop being fashioned from a strip having the ends overlapping, and being provided with a removable connecting member for said overlapping end.

In testimony whereof I have signed my name to this specification in the presence of two subscribing witnesses.

OSCAR JOHN WEEKS.

Witnesses:
JOHN K. BRACHVOGEL,
PHILIP D. ROLLHAUS.